US005087515A

United States Patent [19]

Stevens et al.

[11] Patent Number: 5,087,515

[45] Date of Patent: Feb. 11, 1992

[54] CHAFF FIBER COMPRISING INSULATIVE COATING THEREON, AND HAVING AN EVANESCENT RADAR REFLECTANCE CHARACTERISTIC, AND METHOD OF MAKING THE SAME

[75] Inventors: Ward C. Stevens, New Fairfield; Edward A. Sturm, New Milford; Bruce C. Roman, Danbury, all of Conn.

[73] Assignee: Advanced Technology Materials, Inc., Danbury, Conn.

[21] Appl. No.: 449,695

[22] Filed: Dec. 11, 1989

[51] Int. Cl.[5] .......... B32B 3/26

[52] U.S. Cl. .......... 428/315.9; 428/312.8; 428/315.5; 428/315.7; 428/367; 428/379; 428/380; 428/381; 428/384; 428/388; 428/389; 428/390; 428/392

[58] Field of Search .......... 428/379, 380, 381, 384, 428/388, 389, 390, 392, 367, 312.8, 315.5, 315.7, 315.9

[56] References Cited

U.S. PATENT DOCUMENTS

| | | | |
|---|---|---|---|
| 2,682,783 | 2/1954 | Drummond | 18/54 |
| 2,818,351 | 12/1957 | Nack et al. | 428/388 |
| 2,920,981 | 1/1960 | Whitehurst | 117/71 |
| 3,097,941 | 7/1963 | Toulmin, Jr. | 65/3 |
| 3,129,487 | 4/1964 | Whitacre et al. | 18/75 |
| 3,221,875 | 7/1963 | Paquette | 206/65 |
| 3,544,997 | 2/1967 | Turner et al. | 343/18 |
| 3,549,412 | 12/1970 | Frye et al. | 117/100 |
| 3,725,927 | 3/1973 | Fiedler | 343/18 |
| 3,765,931 | 10/1973 | Kyri et al. | 117/129 |
| 3,952,307 | 4/1976 | Nagler | 343/18 |
| 4,759,950 | 7/1988 | Stevens | 427/55 |
| 4,942,090 | 7/1990 | Morin | 428/367 |

OTHER PUBLICATIONS

Butters, Bryan C. F., "Electronic Counter Measures/-Chaff", IEEE Proceedings, vol. 129, Part F, No. 3, Jun. 1982, pp. 197-201.

*Primary Examiner*—Merrell C. Cashion, Jr.
*Assistant Examiner*—D. S. Nakarani
*Attorney, Agent, or Firm*—Steven J. Hultquist

[57] ABSTRACT

An article comprising a non-conductive substrate which is coated with a sub-micron thickness of an oxidizable metal and overcoated with a microporous layer of an inorganic electrically insulative material. Optionally, the oxidizable metal-coated substrate may be sulfurized and/or further coated with (i) a promoter metal which is galvanically effective to promote the corrosion of the oxidizable metal, discontinuously coated on the oxidizable metal coating, and/or (ii) a salt, to accelerate the galvanic corrosion reaction by which the oxidizable metal coating is oxidized, prior to overcoating with the microporous insulative layer. Also disclosed is a related method of forming such articles, comprising chemical vapor depositing the oxidizable metal coating on the substrate and contacting the metallized substrate with a sol gel dispersion of the inorganic electrically insulative material which then is dried under suitable conditions to form the microporous layer on the substrate. When utilized in a form comprising fine diameter substrate elements such as glass or ceramic filaments, the resulting product may usefully be employed as an evanescent chaff. In the presence of atmospheric moisture, such evanescent chaff undergoes oxidation of the oxidizable metal coating so that the radar signature of the chaff transiently decays.

27 Claims, 3 Drawing Sheets

CHAFF FIBER COMPRISING INSULATIVE COATING THEREON, AND HAVING AN EVANESCENT RADAR REFLECTANCE CHARACTERISTIC, AND METHOD OF MAKING THE SAME

CROSS-REFERENCE TO RELATED APPLICATIONS

This application is co-filed with the following related applications, all assigned to the assignee hereof: U.S. application Ser. No. 07/448,252, filed Dec. 11, 1989, of Ward C. Stevens, Edward A. Sturm, and Bruce C. Roman, for "SALT-DOPED CHAFF FIBER HAVING AN EVANESCENT ELECTROMAGNETIC DETECTION SIGNATURE, AND METHOD OF MAKING THE SAME"; application Ser. No. 07/449,708, filed Dec. 11, 1989, of Ward C. Stevens, Edward A. Sturm and Delwyn F. Cummings, for "GALVANICALLY DISSIPATABLE EVANESCENT CHAFF FIBER, AND METHOD OF MAKING THE SAME;" and U.S. application Ser. No. 07/450,585, filed Dec. 11, 1989, of Ward C. Stevens, Edward A. Sturm and Bruce C. Roman for "SULFURIZED CHAFF FIBER HAVING AN EVANESCENT RADAR REFLECTANCE CHARACTERISTIC, AND METHOD OF MAKING THE SAME."

BACKGROUND OF THE INVENTION

1. Field of the Invention

This invention relates to chaff with a transient radar reflectance characteristic, having utility as an electronic warfare countermeasure useful as an electromagnetic detection decoy or for anti-detection masking of an offensive attack.

2. Description of the Related Art

In modern warfare, a wide variety of weapons systems are employed which operate across the electromagnetic spectrum, including radio waves, microwaves, infrared signals, ultraviolet signals, x-rays, and gamma rays.

To counter such weapons systems, smoke and other obscurants have been deployed. In the past, smoke has been variously employed as a means of protection of ground-based military vehicles and personnel during conflict, to blind enemy forces, to camouflage friendly forces, and to serve as decoys to divert hostile forces away from the positions of friendly forces. With the evolution of radar guided missiles and increasing use of radar systems for battlefield surveillance and target acquisition, the obscurant medium must provide signal response in the millimeter wavelengths of the electromagnetic spectrum.

The use of "chaff", viz., strips, fibers, particles, and other discontinuous-form, metal-containing media to provide a signal response to radar, began during World War II. The first use of chaff involved metal strips about 300 millimeters long and 15 millimeters wide, which were deployed in units of about 1,000 strips. These chaff units were manually dispersed into the air from flying aircraft, to form chaff "clouds" which functioned as decoys against radars operating in the frequency range of 490–570 Megahertz.

Chaff in the form of aluminum foil strips has been widely used since World War II. More recent developments in chaff technology include the use of aluminum-coated glass filament and silver-coated nylon filament.

In use, chaff elements are formed with dimensional characteristics creating dipoles of roughly one-half the wavelength of the hostile electromagnetic system. The chaff is dispersed into a hostile radar target zone, so that the hostile radar "locks onto" the signature of the chaff dispersion. The chaff is suitably dispersed into the air from airborne aircraft, rockets or warheads, or from ground-based deployment systems.

The chaff materials which have been developed to date function effectively when deployed at moderate to high altitudes, but are generally unsatisfactory as obscuration media in proximity to the ground due to their high settling rates. Filament-type chaff composed of metal-coated fibers may theoretically be fashioned with properties superior to metal strip chaff materials, but historically the "hang time" (time aloft before final settling of the chaff to the ground) is unfortunately still too short to accommodate low altitude use of such chaff. This high settling rate is a result of large substrate diameters necessary for standard processes, typically on the order of 25 microns, as well as thick metal coatings which increase overall density. A further problem with metallized filaments is that typical metal coatings, such as aluminum, remain present and pose a continuing electrical hazard to electrical and electronic systems after the useful life of the chaff is over.

It would therefore be a substantial advance in the art to provide a chaff material which is characterized by a reduced settling rate and increased hang time, as compared with conventional chaff materials, and which overcomes the persistance of adverse electrical characteristics which is a major disadvantage of conventional chaff materials.

Accordingly, it is an object of the present invention to provide an improved chaff material which overcomes such difficulties.

It is another object of the present invention to provide a chaff material having a metal component with an evanescent electromagnetic detection signature.

It is another object of the present invention to provide a chaff material whose electronic signature may be selectively adjusted so that the chaff material is transiently active for a predetermined time, consistent with its purpose and its locus of use.

Other objects and advantages of the present invention will be more fully apparent from the ensuing disclosure and appended claims.

SUMMARY OF THE INVENTION

In one aspect, the present invention relates to an article comprising a non-conductive substrate which is coated with a sub-micron thickness of an oxidizable metal and overcoated with a microporous layer of an inorganic electrically insulative material.

The inorganic electrically insulative material may, for example, comprise a glass or ceramic, and preferably is selected from the group consisting of polysilicate, titania, and alumina, and combinations thereof. The polysilicate, titania, and/or alumina layer may suitably be formed by a sol gel formation technique.

Originally, the oxidizable metal coating on the non-conductive substrate may be sulfurized to enhance the oxidizability thereof. The sulfurized oxidizable metal coating may, for example, comprise from about 0.01 to about 10% by weight, based on the weight of oxidizable metal, of sulfur associated with an oxidizable metal coating.

The oxidizable metal employed in the coated article of the present invention may suitably comprise a metal selected from the group consisting of iron, nickel, copper, zinc, and tin, and combinations thereof. Preferably the oxidizable metal is iron.

In another aspect, the present invention relates to an article as broadly described above, having (i) a promoter metal which is galvanically effective to promote the corrosion of the oxidizable metal, discontinuously coated on the oxidizable metal coating, and/or (ii) a salt on the oxidizable metal coating, wherein the microporous layer of inorganic electrically insulative material is overcoated on the applied promoter metal and/or salt on the oxidizable metal coating.

The non-conductive substrate may be formed of any of a wide variety of materials, including glasses, polymers, preoxidized carbon, non-conductive carbon, and ceramics, with glasses, particularly silicate glasses, generally being preferred.

The preferred polysilicate, titania, and/or alumina microporous layer materials suitably may have a porous microstructure characterized by an average pore size of from about 50 to about 1000 Angstroms. Preferably such overcoat layer is formed by a sol gel layer formation technique of the type disclosed in U.S. Pat. No. 4,738,896 issued Apr. 19, 1988 to W. C. Stevens, the disclosure of which hereby is incorporated by reference.

When the oxidizable metal coating is optionally sulfurized to enhance the oxidizability thereof, the sulfur constituent associated with the oxidizable metal coating may be present on and/or within the oxidizable metal coating, in any suitable form which is efficacious to promote the corrosion of the oxidizable metal under metal oxidation conditions applicable thereto. Thus, the sulfur constituent is present in an oxidation-enhancing amount for the oxidizable metal, whereby the corrosion of the oxidizable iron coating under corrosion conditions takes place at a rate and/or to an extent which is higher than would be the case in the absence of the sulfur constituent.

As used herein, the term "sulfur" is intended to be broadly construed to include sulfur, sulfur compounds, sulfur complexes, and any other forms of sulfur which are oxidation-enhancing in character, relative to the oxidizable metal.

The promoter metal referred to above may comprise any of various suitable metals, such as cadmium, cobalt, nickel, tin, lead, copper, mercury, silver, and gold, with copper being preferred in the case of a conductive iron coating due to its low toxicity, low cost, and low oxidation potential.

The salt doping referred to above may be carried out with any of various suitable salts, including metal halide, metal sulfate, metal nitrate, and organic salts. Preferably the salt is a metal halide salt, whose halide constituent is chlorine. It is also permissible in the broad practice of the invention to provide such salt doping by exposure of the oxidizable metal to halogen gas, to form the corresponding metal halide on the surface of the oxidizable metal film.

In chaff applications, wherein the chaff article includes a filamentous or other fine-diameter substrate element, the oxidizable metal coating of the invention is characterized by a radar signature which in the presence of moisture, e.g., atmospheric humidity, decays as a result of progressive oxidation of the continuous metal coating.

In a broad method aspect, the present invention relates to a method of forming an evanescently conductive coating on a non-conductive substrate, comprising:

(a) depositing on the substrate a sub-micron thickness of oxidizable metal, to form a conductive metal coated substrate, wherein the oxidizable metal may for example comprise a metal constituent selected from the group consisting of iron, nickel, copper, zinc, and tin, and combinations thereof; and (b) overcoating the oxidizable metal coating deposited on the substrate with a microporous layer of an inorganic electrically insulative material, which as indicated preferably is a glass or ceramic material, and most preferably is a material selected from the group consisting of polysilicate, titania, alumina, and combinations thereof.

In a further method aspect, the oxidizable metal-coated substrate, formed as described above, may, prior to overcoating with the microporous layer of inorganic electrically insulative material, be further treated by one or more of the following steps: (i) sulfurizing the oxidizable metal film, (ii) coating the oxidizable metal coating with a discontinuous film of a promoter metal which is galvanically effective to promote corrosion of the oxidizable metal coating; and (iii) coating the oxidizable metal coating with a salt, all of such optional treatment steps being selectively employable to further enhance the oxidization of the continuous metal coating on the substrate.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
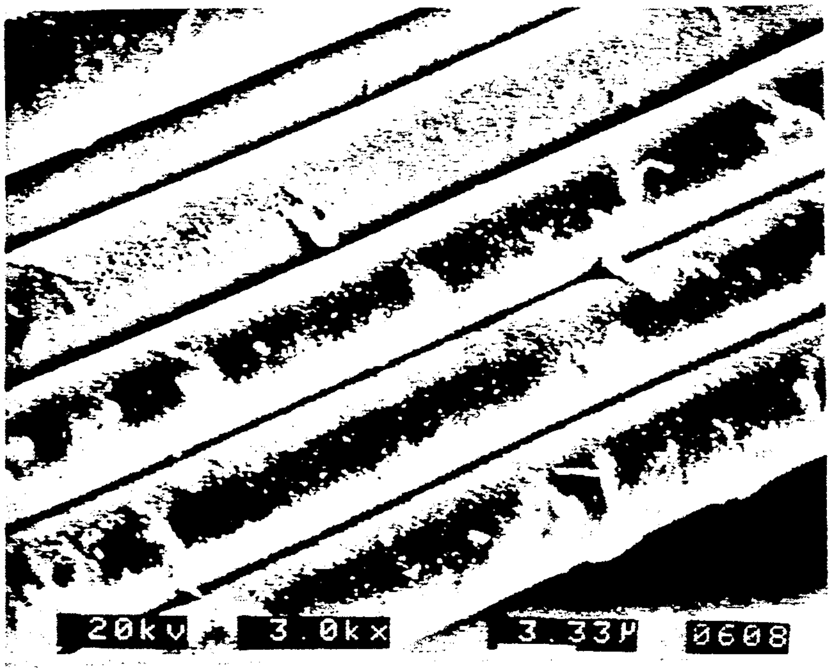
FIG. 1 is an electron photomicrograph, at magnification of 3000 times, of a tow of silica-overcoated, iron-coated glass filaments.

The present invention relates broadly to an article comprising a non-conductive substrate which is coated with a sub-micron thickness of an oxidizable metal and overcoated with a microporous layer of an inorganic electrically insulative material.

The microporous layer of inorganic electrically insulative material preferably is from materials such as glasses and/or ceramics, and most preferably such layer is formed of a material selected from the group consisting of polysilicate, titania, and alumina, and combinations thereof. The preferred polysilicate, titania, and/or alumina microporous layers may suitably be formed by sol gel formation techniques, as described more fully hereinafter.

Although discussed primarily in the ensuing description in terms of chaff article applications, wherein the substrate element is preferably a fine-diameter filament, the utility of the present invention is not thus limited, but rather extends to any other applications in which a temporary conductive coating on a substrate is desired.

Examples of other illustrative applications include moisture sensors, corrosivity monitors, moisture barrier devices, and the like.

Accordingly, the substrate may have any composition and may take any form which is suitable to the manufacturing conditions and end use environment of the product article.

For chaff applications, it is preferred that the substrate be in filamentous (i.e., fiber) form, however, other substrate forms, such as microbeads, microballoons, hollow fibers, powders, flakes, ribbons, and the like, may be employed.

For applications other than chaff, it may be necessary or desirable to provide the substrate element in bulk physical form, or alternatively in a finely divided form, a filamentous form, or a particulate form, of the general types illustratively described above in connection with chaff articles according to the invention.

Irrespective of its physical form, the substrate element is non-conductive in character, and may be formed of any material which is appropriate to the processing conditions and end use applications of the product article. Illustrative substrate element materials of construction include glass, polymeric, ceramic, pre-oxidized carbon, and non-conductive carbon materials.

By "pre-oxidized carbon" is meant polyacrylonitrile fibers which have been heat stabilized.

Among the foregoing classes or materials, glasses and ceramics are preferred in most instances where cost and weight considerations predominate.

Illustrative examples of potentially useful polymeric materials of construction for substrate elements include fibers of polyethylene, polyacrylonitrile, polyester, and polymeric materials commercially available under the trademarks Kevlar® and Kynol®.

In chaff applications, the density of the substrate element material of construction preferably is less than 2.9 grams per cubic centimeter, and most preferably is on the order of from about 1.3 to about 2.9 grams per cubic centimeter.

The most preferred materials of construction for chaff articles of the present invention are glasses, particularly oxide glasses, and more specifically silicate glasses. Silicate glasses have been advantageously employed in filamentous substrate elements in the practice of the present invention, and sodium silicate, borosilicate, calcium silicate, aluminosilicate, and aluminoborosilicate glasses may also be used to advantage.

In general, the glasses useful for substrate elements in chaff applications have a density on the order of from about 2.3 to about 2.7 grams per cubic centimeter.

When filamentous glass substrate elements are employed to form chaff articles in accordance with the present invention, the fiber diameter of the substrate element is on the order of about 0.5 to about 25 microns, and preferably is on the order of from about 2 to about 15 microns. It is believed that if the fiber diameter is decreased substantially below about 3 microns, the coated chaff fibers tend to become respirable, with a corresponding adverse effect on the health, safety, and welfare of persons exposed to such chaff. If, on the other hand, the diameter of the glass chaff fiber is increased substantially above 12 microns, the fiber tends to exhibit poor hang times, dropping too rapidly for effective utilization. These size constraints are dictated by the character and properties of the substrate element material of construction. Lower density fibers may be successfully employed at larger diameters.

It will be appreciated that the specific size and dimensional characteristics, physical properties, and material of construction of the substrate element may be varied widely in the broad practice of the present invention, the specific choice of material, size, and properties thereof being readily determinable without undue experimentation by those skilled in the art, having regard to the specific end use application in which the coated substrate is to be employed.

Deposited on the substrate is a sub-micron thickness of an oxidizable conductive metal coating, which may be formed of any suitable metal-containing composition which includes a metal which is oxidizable in character. Preferably, the oxidizable metal coating is formed of a metal selected from the group consisting of iron, nickel, copper, zinc, tin, and combinations (i.e., alloys, mixtures, eutectics, etc.) thereof. By "sub-micron thickness" is meant that the oxidizable metal coating has an applied thickness of less than 1.0 micron, consistent with the objective of the invention to provide a conductive coating on the substrate which is rapidly rendered non-conductive by oxidation thereof. Further, it has been found that at oxidizable metal coating thicknesses above about 1.0 micron, metal coated filaments in chaff applications tend to stick or adhere to one another, particularly when the chaff is provided in the form of multifilament tows, which typically may contain on the order of from about 200 to about 50,000 filaments per tow, and preferably contain from about 1,000 to about 12,000 filaments per tow. Additionally, it has been found that oxidizable metal coating thicknesses significantly above 1.0 micron, differential thermal effects and/or deposition stresses tend to adversely affect the adhesion of the metal film to the substrate element, with consequent increase in the tendency of the metal film on the coated article to chip or otherwise decouple.

In chaff applications utilizing filamentous substrate elements, the oxidizable metal coating thickness may suitably be on the order of 0.002 to about 0.25 micron, with a thickness range of from about 0.025 to about 0.15 micron being generally preferred. Disproportionately lower film thicknesses of the oxidizable metal coating result in discontinuities which in turn adversely affect the desired conductivity characteristics of the applied oxidizable metal coating.

In chaff applications, the oxidizable metal preferably is iron, although other metal species such as copper, nickel, zinc, and tin may potentially advantageously be employed, as well as combinations of such metals.

To achieve the desired sub-micron thicknesses of the oxidizable metal coating on the substrate, it is preferred in practice to utilize chemical vapor deposition processes to deposit elemental metal on the substrate from an organometal precursor material for the oxidizable metal, although any other process techniques or methods which are suitable to deposit the oxidizable metal coating in a desired thickness may be usefully employed.

It will be recognized, however, that the specific substrate element material of construction must be selected to retain the substrate element's desired end-use characteristics during the oxidizable metal coating operation, as well as during the subsequent treatment steps. Accordingly, when chemical vapor deposition is employed to deposit an oxidizable metal, e.g., iron, on the substrate, temperatures in the range of 90° C.–800° C. can be involved in respective steps of the coating process. Oxidizable metal application temperatures are dictated by the thermal carrying properties and thermal stability of the substrate. Thus, these properties of the substrate can determine the properties of the deposited film. Accordingly, a substrate material accommodating a range of processing temperatures is preferred, e.g., glass or ceramic.

As an example of the utilization of chemical vapor deposition to deposit an elemental iron coating on a substrate material, the substrate element may be a silicate glass fiber with a diameter on the order of 3–8 microns. Such fibers may be processed in a multizone chemical vapor deposition (CVD) system including a first stage in which the substrate filament is desized to remove epoxy or starch size coatings, at a temperature which may be on the order of 650° C.–800° C. and under an inert or oxidizing atmosphere. Following desizing, the clean filament may be conducted at a temperature of 450° C.–600° C. into a coating chamber of the CVD system. In the coating chamber, the hot filament is exposed to an organoiron precursor gas mixture, which may for example comprise iron pentacarbonyl as the iron precursor compound, at a concentration of 5–50% by weight in a carrier gas such as hydrogen. This source gas mixture may be at a temperature on the order of 75° C.–150° C. in the coating chamber, whereby elemental iron is deposited on the substrate element from the carbonyl precursor compound. The coating operation may be carried out with a series of successive heating and coating steps, to achieve a desired film thickness of the applied iron coating.

It will be appreciated that the foregoing description of coating of the non-conductive substrate with iron is intended to be illustrative only, and that in the broad practice of the present invention, other CVD iron precursor compound gas mixtures may be employed, e.g., ferrocene in a hydrogen carrier gas. Alternatively, other non-CVD techniques may be employed for depositing the oxidizable metal on the substrate, such as solution plating of iron or other suitable oxidizable metal species.

As indicated herein earlier, a major disadvantage of conventional chaff materials is the persistence of adverse electrical and radar reflectance characteristics.

The adverse electrical characteristics result from the fact that chaff formed of or comprising electrically conductive materials may cause electromagnetic interference to be experienced by electrical and electronic devices in the chaff's locus of use. This is particularly true when the chaff is in finely divided form, and is able to physically enter enclosures or housings containing circuitry of such electrical and electronic devices and cause shorting out of circuitry or circuit components.

Correspondingly, the persistence of the radar reflectance characteristic of conventional chaff permits its redispersion causing adverse environmental effects. The chaff material is low density, and, since upon settling such chaff retains its electrical conductivity and radar signature, it can readily be made airborne in turbulent air flow causing unwanted electronic interference. Contrariwise, the evanescent chaff of the present invention provides a disappearing or at least substantially attenuated electrical conductivity and radar reflectance characteristic, which permits chaff to be utilized more effectively by serial deployment of the chaff to simulate decoy target "movement."

In the broad practice of the present invention, the oxidizable conductive metal coating formed on the non-conductive substrate is overcoated with a microporous layer of an inorganic electrically insulative material.

Such microporous insulative layer has two functions. Being electrically insulative, it serves to attenuate direct contact between the oxidizable metal coating and sensitive electrical or electronic devices, which may result in damage to circuitry or components therein, or otherwise adversely affect the function of such devices.

In addition, although the porosity of the insulative layer accommodates penetration of atmospheric moisture (relative humidity) to the oxidizable metal coating, to effect corrosion thereof and thereby dissipate the metal coating's conductive characteristics, it has surprisingly and unexpectedly been found that the morphology of the microporous insulative layer serves to assist in retaining moisture in proximity to the oxidizable metal coating. Such moisture "fixing" may substantially increase the rate of oxidization of the oxidizable metal coating, with the specific magnitude of such enhancement depending on the morphology and composition of the insulative layer, and the exposure (relative humidity) conditions to which the coated article is exposed.

The microporous layer of electrically insulative material may be formed of any suitable material which is electrically insulative in character. Such layer may be applied to the oxidizable metal coating on the non-conductive substrate in a form having or treatable to produce microporosity which allows oxidation of the oxidizable metal coating to take place, i.e., the insulative layer must be of sufficient porosity to permit permeation of moisture and oxygen to the underlying oxidizable metal film.

Preferred microporous insulative layer materials of construction include glasses and ceramics. Such glasses may include silica glasses and borosilicate glasses, etc., and suitable ceramics may include mullite, alumina, titania, etc.

Most preferably, the insulative layer is formed of a material selected from the group consisting of polysilicate, titania, alumina, and combinations thereof. By "combination" is meant that any two or more of such polysilicate, titania, and alumina materials may be utilized with one another, interspersed with one another, or otherwise concurrently present in a microporous composite matrix layer. When titania is employed as a microporous layer material of construction it is preferred that such material be essentially completely free of palladium.

A suitable porous microstructure in the insulative layer may for example have an average pore size, i.e., pore diameter, on the order of from about 50 to about 1000 Angstroms, preferably from about 100 to about 500 Angstroms. Insulative layers comprising polysilicate materials, having an average pore size of from about 100 to about 500 Angstroms, are particularly usefully employed in the practice of the present invention.

The most preferred polysilicate, titania, and/or alumina microporous layers may be formed with the characteristics and by the formation methods described in the aforementioned U.S. Pat. No. 4,738,896, the disclosure of which hereby is incorporated herein by reference.

Generally, the microporous insulative layer may be formed on the oxidizable metal coating in any suitable manner, e.g., by electrolytic methods, chemical vapor deposition, etc., however it is preferred to form the insulative layer on the oxidizable metal coating by applying over the metal coating a sol gel dispersion, which then is dried, under ambient or elevated temperature conditions, as required, to form the product overcoat insulative layer.

For insulative layers comprising a polysilicate material, as formed on the oxidizable metal coating from a sol gel dispersion of polysilicate, a suitable polysilicate starting material may comprise a tetraalkylorthosilicate, such as tetraethylorthosilicate, or tetramethylorthosilicate.

The tetraalkylorthosilicate suitably is hydrolyzed in a solvent medium comprising an aqueous solution of an organic alcohol, such as a $C_1$-$C_8$ alcohol. Following the hydrolysis in which the tetraalkylorthosilicate reacts to form the corresponding silanol, the silanol product is condensed to form polysilicate as a dispersed phase component of the resulting sol gel dispersion.

For sol gel formation a titania or alumina overlayers, the sol gel may be formed as a dispersion of titanium alkoxide or aluminum alkoxide, respectively, in solvent solutions such as those described above with respect to polysilicate sol gel dispersions.

Once applied to the oxidizable metal coating, by any suitable method, such as for example dipping (tub sizing), spraying, roller coating, brushing, and the like, the sol gel dispersion is dried to remove the organic and aqueous solvents (along with any volatile products of the condensation reaction, in the case of the aforementioned polysilicate sol gel dispersion) therefrom, to yield the insulative layer as a dry coating layer on the substrate.

It will be appreciated that the thicknesses of the respective oxidizable metal layer and insulative layer may be varied widely and independently of one another, subject of course to the requirement that the oxidizable metal coating is present at a sub-micron thickness on the non-conductive substrate, to provide respective layers most appropriately dimensioned to the end use application intended for the coated product article.

In general, it will be satisfactory to provide the insulative layer at a thickness of from about 200 to about 2500 Angstroms, with insulative layer thicknesses of from about 200 to about 1000 Angstroms being generally satisfactory in chaff applications. The preferred insulative layer formation by sol gel techniques may be widely varied in character, as known to those skilled in the art, to produce an insulative layer of a desired composition, morphology, and physical characteristics.

In the case of the preferred polysilicate, titania, and/or alumina materials, the sol gel dispersion may suitably comprise the insulative material constituent (or a precursor thereof) in an aqueous solution of an alkanol such as ethanol, as the solvent component of the sol gel mixture. After the sol gel dispersion is coated on the oxidizable metal coating, the coated article may be passed through a dehydration furnace to effect drying of the sol gel coating.

The dried sol gel coating has a porous microstructure. The temperature of the drying step, and the other drying conditions, may be appropriately selected to partially collapse the pores of the coating to control its hardness and other physical and performance properties. Thus, temperatures sufficiently high to cause microstructural changes such as pore collapse can be achieved by appropriate drying conditions, to tailor the morphology of the insulative layer so that an overcoat layer of the desired characteristics is achieved. The porosity of the insulative layer is readily determinable by standard porosimetry techniques, so that one of ordinary skill may easily determine the sol pH, drying, and any heat treatment conditions necessary to obtain a desired porosity, without undue experimentation.

It is within the purview of the present invention to modify the chemical composition of the sol gel dispersion to provide covalent or associative bonding of the oxidizable metal coating to the insulative layer.

In the broad practice of the present invention, the oxidizable coating formed on the non-conductive substrate may optionally be "sulfurized," i.e., have sulfur associated therewith, before, during, and/or after the application of the oxidizable metal coating to the substrate. For example, a sulfur-containing material may be applied to the substrate prior to application of the oxidizable metal coating thereon, or the sulfur constituent may be co-deposited with the oxidizable metal coating, or serially applied between successive applications of oxidizable metal film to yield the final oxidizable metal coating, or the sulfur constituent may be applied to an external surface of the applied oxidizable metal coating, or by any combinations of such steps, or selected ones thereof, with or without other steps, for associating sulfur with the oxidizable metal.

Preferably, the amount of sulfur associated with the sulfurized, oxidizable metal coating on the substrate is from about 0.01 to about 10% by weight of sulfur, based on the weight of oxidizable metal in the oxidizable metal coating on the non-conductive substrate. More preferably, the amount of sulfur associated with the oxidizable metal coating is from about 0.02 to about 5% by weight, and most preferably from about 0.05 to about 2.0% by weight, on the same oxidizable metal weight basis. As used in such quantitative ranges of concentration, the amount of sulfur refers to the amount of elemental sulfur. It is to be appreciated that the sulfur constituent associated with the oxidizable metal coating may take any of a wide variety of forms, including elemental sulfur, compounds of sulfur such as iron sulfide, hydrogen sulfide, and sulfur oxides, as well as any other sulfur-containing compositions which provide sulfur in a form which is effective to enhance the rate and/or extent of corrosion of the oxidizable metal coating on the substrate.

The sulfur constituent is associated with the oxidizable metal coating on the substrate, e.g., within the oxidizable metal coating and/or on a surface of the oxidizable metal coating, and/or otherwise in sufficient proximity to the oxidizable metal coating to render the sulfur in the sulfur constituent enhancingly effective for the oxidation of the oxidizable metal coating. Preferably, the sulfur constituent is associated with the oxidizable metal coating, by being present in the oxidizable metal coating itself and/or on a surface of the oxidizable metal coating.

As indicated hereinabove, it generally is preferred to deposit the oxidizable metal coating on the substrate material by chemical vapor deposition techniques, when the substrate element is glass or ceramic, utilizing an organometallic precursor compound as a source material for the deposited oxidizable metal. The chemical vapor deposition process may involve repetition of successive heating and coating steps for deposition of the oxidizable metal film at a desired thickness, and in such case it generally is preferred to deposit the sulfur constituent, if the oxidizable metal coating is to sulfurized, in the heating zones between successive coating zones of the process system.

In such system, the sulfur-containing material may be introduced in the heating zone(s) to deposit a sulfur constituent on the substrate. The deposited sulfur constituent then is overlaid with a film of applied oxidizable metal coating in the next succeeding oxidizable metal coating zone. In this manner, the sulfur material may be deposited on an initial and the succeeding films of applied oxidizable metal which in the aggregate make up the oxidizable metal coating on the substrate.

For ease of description in the ensuing discussion, each constituent application of oxidizable metal to a substrate in a multi-zone metal coating process system will be referred to as a "pass", so that for example a "five-pass system" entails five discrete applications of oxidizable metal film to the substrate to yield the overall oxidizable metal coating. In such five-pass system, sulfur-containing material may be applied to the oxidizable metal film after the first pass and/or any succeeding pass(es) including the final pass.

Although any suitable application scheme for associating sulfur constituent(s) with the oxidizable metal coating may be employed in a multi-pass system, it generally is desirable to apply the sulfur constituent(s) to the oxidizable metal coating in at least the outer portion of the applied oxidizable metal film. In this manner, sulfur availability in the outer portion of the film is provided for, consistent with the objective of enhancing the corrosion rate of the oxidizable metal film with a sulfur constituent. Typically it is preferred not to deposit the sulfur constituent in an initial filament desizing step, but rather in at least some of the subsequent preheating zones upstream of the corresponding chemical vapor deposition reaction chambers.

In the preheat zone(s), sulfur may for example be introduced in the form of a sulfur compound such as hydrogen sulfide, in a carrier gas such as nitrogen or hydrogen. When hydrogen sulfide is used as the sulfur-containing material for deposition, it generally is suitable to operate the coating process system with a concentration of from about 0.01 to about 20% by weight, based on the total weight of hydrogen sulfide and carrier gas of hydrogen sulfide in the carrier gas. For example, a 10% by weight hydrogen sulfide in hydrogen carrier gas mixture has been used to good advantage.

The heating zone during the deposition of the sulfur material may be maintained at a temperature in the range of from about 450° C. to about 600° C. for the aforementioned hydrogen sulfide/carrier gas mixture, although the specific temperatures, sulfur-containing material, and other process conditions may be widely varied depending on the nature of the application system and the desired final product article.

Generally, hydrogen is preferred as a carrier species for the sulfur-containing material, since hydrogen aids in reducing the previously applied oxidizable metal coating, and opposing the oxidation thereof. Hydrogen sulfide is a preferred sulfur-containing material for use in the aforementioned illustrative chemical vapor deposition system, and when employed in a hydrogen carrier gas, results in the formation of metal sulfide in the previously applied oxidizable metal film, along with the formation of inclusions of hydrogen sulfide, sulfur oxide, and elemental sulfur, in the resulting "sulfurized" coating of oxidizable metal.

It will be appreciated that the method of association of the sulfur material with the oxidizable metal coating may be carried out in a wide variety of methods, and with a wide variety of suitable sulfur-containing materials. For example, it may be advantageous in some applications to sulfurize the oxidizable metal coating by application thereto of a coating of a solvent solution of a suitable sulfur-containing material. As an illustration, it may be desirable to coat the oxidizable metal coating with a solvent solution of a sulfur-containing compound, such as thiophene, whereby subsequent drying of the solution coating will yield the sulfur-containing compound on the oxidizable metal coating.

When the oxidizable metal coating on the substrate is sulfurized to associate sulfur therewith, the rate of corrosion of the oxidizable metal coating can be markedly increased, so that the oxidative conversion of the conductive oxidizable metal coating to non-conductive metal oxide proceeds at an enhanced rate and/or to an enhanced extent.

Further, the corrosion reaction involving the oxidizable metal coating has been found to take place at an accelerated rate when the oxidizable metal coating is sulfurized, even at relatively low humidity exposure conditions, e.g., 11% relative humidity. Thus, the sulfur functions to reduce the amount of atmospheric moisture (water) otherwise required to oxidize the oxidizable metal coating to the corresponding metal oxide reaction product.

When the oxidizable metal film is sulfurized, the specific loading of sulfur associated with the oxidizable metal coating in the article of the present invention may be readily determined by those skilled in the art without undue experimentation, by the simple expedient of varying the sulfur loading and/or metal oxidation (corrosion) conditions, to determine the sulfur loading which is necessary or desirable in a given end use application.

As an example of the oxidation characteristics of sulfurized oxidizable metal coatings in the broad practice of the present invention, it has been found that sulfurization of an iron coating in a chemical vapor deposition process system, of the type previously illustratively described, to provide a 0.1% by weight loading of sulfur in an iron coating of 0.075 micron thickness on a 4.8 micron diameter glass filament, will yield a substantially complete oxidation of the iron coating after about 10 hours at 98% relative humidity exposure conditions.

It will likewise be appreciated that it is feasible in the broad practice of the present invention to selectively vary the sulfur loading associated with the oxidizable metal coating, to achieve a predetermined corrosion rate and service life of the conductive oxidizable metal coating, in chaff or other oxidizable metal coating conductivity dissipation applications.

Subsequent to application to the substrate of the oxidizable metal coating of the desired thickness, and optional sulfurization thereof, but prior to application of the insulative layer overcoat thereon, the oxidizable metal-coated substrate may optionally be coated or "doped" with a discontinuous coating of a "promoter metal" which is galvanically effective to promote the corrosion of the oxidizable metal, on the external surface of the oxidizable metal coating. The promoter metal coating is discontinuous in character, in that the promoter metal coating does not fully cover or occlude the oxidizable metal coating on the non-conductive substrate. As a result of the exposure of the oxidizable metal coating "through" the discontinuous promoter metal coating to the ambient environment, the conductive oxidizable metal coating is converted by atmospheric moisture to a non-conductive metal oxide film, wherein the corrosion rate of the oxidizable metal film is enhanced both by the sulfur constituent and the promoter metal.

Thus, such oxidation or corrosion of the oxidizable metal film is galvanically assisted and accelerated by the discontinuous coating of promoter metal which is superposed on the sulfurized oxidizable metal coating.

The promoter metal discontinuously coated on the oxidizable metal coating as described above may include any suitable metal which is galvanically effective to promote the corrosion of the oxidizable metal. As used in such context, the term "promoter metal" is to be broadly construed to include elemental metal, as well as alloys, intermetallics, composites, or other materials containing a corrosion promotingly effective metal constituent.

In order for a metal to be promotingly effective of the corrosion of the oxidizable metal film, and assist in the oxidation of the oxidizable metal, the promotor metal must have a lower standard oxidation potential than the elemental oxidizable metal constituent, thereby enabling the promoter metal to act as a cathodic constituent in the galvanic corrosion reaction. Illustrative of elemental promoter metals which may be potentially usefully employed in the broad practice of the present invention are cadmium, cobalt, nickel, tin, lead, copper, mercury, silver, and gold. In general, the lower the oxidation potential, $E^0$, the faster is the reduction-oxidation corrosion reaction.

Of the above-listed exemplary elemental metals useful in the broad practice of the present invention and with preference to iron as the oxidizable conductive metal coating, copper is typically a preferred elemental metal, due to its low toxicity, low cost, and low oxidation potential.

The application or formation of the discontinuous coating of promoter metal on the oxidizable metal coating may be carried out in any suitable manner, such as flame spraying, low rate precipitation in a plating bath, or other surface application methods. It is also within the broad purview of the present invention to provide a continuous film of the promoter metal on the oxidizable metal coating, and to thereafter preferentially etch or attack the continuous promoter metal film to render same discontinuous in character. Further, it is possible to form the discontinuous promoter metal film on the oxidizable metal coating film by in situ chemical reaction, wherein the reaction product comprises a promoter metal species which is effective to galvanically accelerate the corrosion of the oxidizable metal coating under ambient exposure conditions in the presence of atmospheric moisture.

In general, however, it is preferred to achieve a discontinous deposition of the promoter metal on the oxidizable metal-coated substrate by chemical vapor deposition techniques, utilizing as the precursor material for the promoter metal an organometal compound whose metallic moiety is the promoter metal. In order to form the discontinuous promoter metal coating, the concentration of the organometal precursor in the gas stream introduced to the chemical vapor deposition chamber should be suitably low. The specific concentrations and process conditions which are suitable to form discontinous promoter metal films from a given organometal precursor material will be readily determinable by those of ordinary skill in the art, without undue experimentation.

As indicated, for iron coated substrates, copper typically is a most preferred promoter metal species. Tin is also preferred and, to a lesser extent, nickel, although nickel may be unsatisfactory in some applications due to toxicity considerations, depending on the ultimate end use.

For the aforementioned most preferred copper promoter metal species, application of the discontinuous coating of copper to the oxidizable metal-coated substrate by chemical vapor deposition techniques may utilize copper hexafluoroacetylacetonate as an organocopper precursor compound for elemental copper deposition. In the chemical vapor deposition process, the gas-phase concentration of this organocopper precursor compound is maintained at a suitably low level, e.g., not exceeding about 200 grams per cubic centimeter of the vapor (carrier gas and volatile organometal precursor compound), and typically much lower, such as for example 0.001 gram per cc. By maintaining the vapor-phase concentration of the promoter metal precursor compound suitably low, the discontinuous coating of the promoter metal is achieved. For example, at the forementioned concentration of 0.001 gram of copper hexafluoroacetylacetonate per cubic centimeter of vapor mixture in the chemical vapor deposition chamber, it is possible to form localized discrete deposits, e.g., "islands," of the promoter metal derived from the organometal precursor compound.

The choice of a specific organometallic precursor compound for the promoter metal may be suitably varied, depending on the chemical vapor deposition process conditions, metal constituent, character of the oxidizable metal-coated substrate, etc., as will be apparent of those skilled in the art. In the case of tin as the promoter metal, a suitable organometallic precursor compound is tetramethyl tin.

As a further optional treatment of the oxidizable metal-coated substrate, which may be employed with or without the aforementioned optional sulfurization of the oxidizable metal coating, and with or without the aforementioned optional application of a promoter metal, the oxidizable metal-coated substrate may be further coated or "doped" with a suitable amount for example from about 0.005 to about 25% by weight, based on the weight of oxidizable metal in the oxidizable metal coating, of a salt, e.g., a metal salt or organic salt, on the external surface of the oxidizable metal coating. Alternatively, it may be desirable to provide a salt on the external surface of the oxidizable metal coating by exposure of the coating to a halogen, e.g., chlorine gas, to form the corresponding metal halide.

Since it is desired that the oxidizable metal coating be retained in an oxidizable state, the oxidizable metal-coated substrate suitably is processed during the oxidizable metal deposition, optional sulfurization, optional promoter metal application, optional salt application or formation, and the insulative layer overcoating, any as well as during succeeding treatment steps, under an inert or other non-oxidizable atmosphere.

The optional salt coating of the oxidizable metal-coated substrate advantageously may be carried out by passage of the oxidizable metal-coated substrate through a bath containing a solution of the salt, or in any other suitable manner, effecting the application of the salt to the external surface of the oxidizable metal coating. In most instances, solution bath application of the salt is preferred, and for such purpose the bath may contain a low concentration solution of salt in any suitable solvent. Preferably, the solvent is anhydrous in character, to minimize premature oxidation of the oxidizable metal coating. Alkanolic solvents are generally suitable, such as methanol, ethanol, and propanol, and such solvents are, as indicated, preferably anhydrous in character. The salt may be present in the solution at any suitable concentration, however it generally is satisfactory to utilize a maximum of about 25% by weight of the salt, based on the total weight of the salt solution.

In the preferred salt solution formation of a salt coating on the oxidizable metal surface, any suitable salt may be employed in the salt solution bath, although metal halide salts and metal sulfate salts are preferred. Among metal halide salts, the halogen constituent preferably is chlorine, although other halogen species may be utilized to advantage. Examples of suitable metal halide salts include lithium chloride, sodium chloride, zinc chloride, and iron (III) chloride. A preferred metal sulfate species is copper sulfate, $CuSO_4$. Broadly, from about 0.005% to about 25% by weight of salt, based on the weight of oxidizable metal in the oxidizable metal coating, may be applied to the oxidizable metal coating, with from about 0.05% to about 20% by weight being preferred and from about 0.1% to about 15% by weight being most preferred (all percentages of salt being based on the weight of oxidizable metal in the oxidizable metal coating on the substrate element).

Among the aforementioned illustrative metal chlorides, iron (III) chloride is a preferred salt. It is highly hygroscopic in character, binding six molecules of water for each molecule of iron chloride in its most stable form. Iron (III) chloride has the further advantage that it adds Fe (III) to the metal-coated fiber to facilitate the ionization of the oxidizable metal. For example, in the case of iron as the oxidizable metal on the non-metallic substrate, the presence of Fe (III) facilitates the ionization of Fe (0) to Fe (II). Additionally, iron (III) chloride is non-toxic in character. Copper sulfate is also a preferred salt dopant material since the copper cation functions to galvanically facilitate the ionization of iron, enhancing the rate of dissolution of the iron film, when iron, the preferred oxidizable metal, is employed in the metal coating on the non-metallic substrate.

When the salt dopant is applied from a solution bath, or otherwise from a salt solution, the coated substrate after salt solution coating is dried, such as by passage through a drying oven, to remove solvent from the applied salt solution coating, and yield a dried salt coating on the exterior surface of the oxidizable metal-coating. The temperature and drying time employed in the solvent removal operation may be readily determined by those skilled in the art without undue experimentation, as appropriate to yield a dry salt coating on the oxidizable metal-coated substrate article. When alkanolic solvents are employed, the drying temperature generally may be on the order of about 100° C.

After salt coating of the oxidizable metal-coated substrate, and drying to effect solvent removal from the applied salt coating when the salt is applied from a solvent solution, the resulting salt-doped, oxidizable metal substrate product article is overcoated with the microporous insulative layer, and the overcoated article then is hermetically sealed for subsequent use.

It is to be recognized that the sulfurization of the ozidizable metal coating, the salt coating, and the promoter metal coating, are each optional treatment steps, one or more of which may be carried out as desired in a given application. None of these optional steps are required in the broad practice of the present invention, but merely represent additional coating treatments which may be carried out prior to insulative layer overcoating, to further enhance the oxidization of the oxidizable metal film on the substrate under corrosion-producing conditions.

As indicated, during the processing of the substrate by application of the oxidizable metal-coating thereto, and application of the microporous insulative layer thereover, the coated article suitably is processed under an inert or otherwise non-oxidizing atmosphere to preserve the oxidizable character of the oxidizable metal film. Thus, the oxidizable metal coating, optional sulfurization, optional promoter metal coating, optional salt doping, insulative layer overcoating, and packaging steps may be carried out under a non-oxidizing atmosphere such as nitrogen. In the final packaging step, the oxidizable metal-coated substrate overcoated with the microporous insulative layer may be disposed in a package, chamber, housing or other end use containment means, for storage pending use thereof, with a non-oxidizing environment being provided in such containment means. Thus, the final product article may be stored in the containment means under nitrogen, hydrogen, or other non-oxidizing atmosphere, or in a vacuum, or otherwise in an environment substantially devoid of oxygen or other oxidizing species or constituents which may degrade the oxidizable metal coating or otherwise adversely affect its utility for its intended end use.

Depending on the type and character of the substrate element, it may be desirable to treat the substrate article in order to enhance the adhesion thereto of the oxidizable metal coating. For example, as described above concerning the usage of glass filament as the substrate element, it may be necessary or desirable to desize the glass filament when same is initially provided with a size or other protective coating, such as an epoxy, silane,. or amine size coating, by heat treatment of the filament. More generally, it may be desirable to chemically or thermally etch the substrate surface, such as by acid exposure or flame spray treatment. It may also be desirable to employ a primer or adhesion promoter coating or other interlayer on the substrate to facilitate or enhance the adhesion of the oxidizable metal coating to the substrate. Specifically, it may be desirable in some instances, particularly when the substrate element is formed of materials such as glasses, ceramics, or hydroxy-functionalized materials, to form an interlayer on the substrate surface, formed of a material of the type employed to form the microporous insulative overlayer. Such interlayer thus may comprise a material such as polysilicate, titania, and/or alumina, using a sol gel application technique, as is disclosed and claimed in U.S. Pat. No. 4,738,896 issued Apr. 19, 1988 to W. C. Stevens for "SOL GEL FORMATION OF POLYSILICATE, TITANIA, AND ALUMINA INTERLAYERS FOR ENHANCED ADHESION OF METAL FILMS ON SUBSTRATES," the disclosure of which hereby is incorporated herein by reference.

It may also be necessary or desirable in the broad practice of the present invention to treat or process the oxidizable metal-coated substrate to enhance the adhesion of the discontinuous coating of the promoter metal to the oxidizable metal coating on the substrate.

Referring now to the drawings, FIG. 1 is an electron photomicrograph, at a magnification of 3000 times, of a tow of sulfurized iron-coated glass filaments. Each of the coated filaments comprises an oxidizable iron coating on the exterior surface of the substrate glass filament, with the iron coating having been sulfurized by hydrogen sulfide contacting between successive depositions of iron in a multizone heating/coating chemical vapor deposition system.

The scale of the electron photomicrograph in FIG. 1 is shown by the line in the right central portion at the bottom of the photograph, representing a distance of 3.33 microns.

The glass filaments employed in the tow of coated fiber shown in FIG. 1 were of lime aluminoborosilicate composition, commercially available as E-glass (Owens-Corning D filament) (54% $SiO_2$; 14.0% $Al_2O_3$; 10.0% $B_2O_3$; 4.5% MgO; and 17.5% CaO) having a measured diameter of 4.8 microns, and were coated with an iron coating of 0.075 micron thickness.

The iron-coated filaments then were overcoated with a film of polysilicate representing approximately 0.7% by weight, based on the total weight of the fiber. The polysilicate was applied from a 1% solution of hydrolyzed tetraethylorthosilicate in an aqueous ethanol solution. The thickness range of the polysilicate overcoat was in the range of about 0.02 to about 0.1 micron, with microporosity in the range of from about 0.005 to about 0.10 micron.

Figure 2:
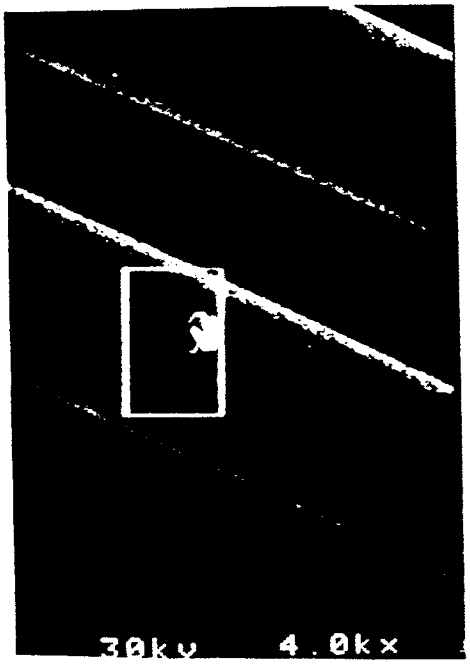
FIG. 2 is a photomicrograph, at magnification of 4000 times, of discrete fibers of silica-overcoated, iron-coated filaments, of the type shown in FIG. 2.
Figure 3:
FIG. 3 is an enlargement of the portion of the electron photomicrograph of FIG. 2 which is demarcated by the rectangular boundary in the central portion thereof.

FIG. 2 is an electron photomicrograph of discrete fibers of the type shown in FIG. 1, at a magnification of 4000 times, and FIG. 3 is an enlarged view of the portion of the FIG. 2 electron photomicrograph demarcated by the rectangular boundary in the left central portion thereof. As shown in FIGS. 2 and 3, the polysilicate coatings are smooth, adherent, and continuous in appearance, while being microporous.

Figure 4:
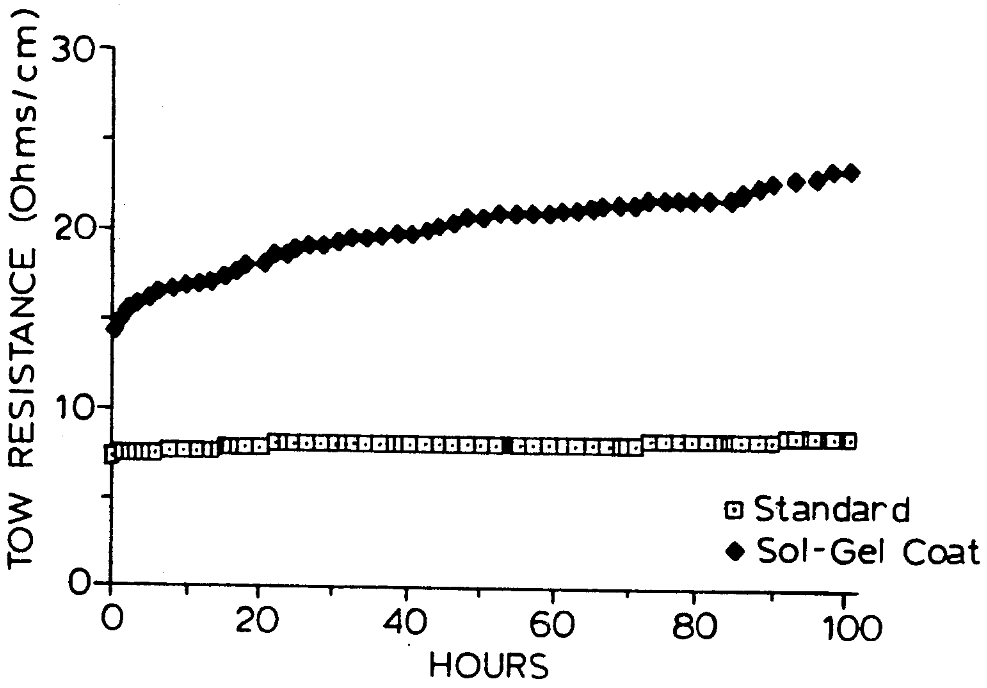
FIG. 4 is a graph of tow resistance, in ohms/cm., as function of exposure time, at 52% relative humidity conditions, for iron-coated glass filaments devoid of any silica-overcoating ("STANDARD") and for a tow of corresponding silica overcoated, iron-coated glass fibers ("Sol-Gel Coat").

FIG. 4 is a graph of tow resistance, in ohms/cm, as a function of time of exposure, in hours, to 50% relative humidity conditions, for fiber tows which comprised approximately 4.8 micron diameter glass filaments as the substrate elements, on which were coated 0.075 micron thicknesses of iron. One such tow was overcoated with a sol gel-applied layer of polysilicate ("Sol Gel Coat"), while the other tow was retained in a non-overcoated condition ("Standard").

The data of FIG. 4 show that the non-overcoated metallized filaments ("Standard") maintained a relatively constant resistance over the full 100 hour period of exposure. By contrast, the polysilicate-overcoated metallized filaments ("Sol-Gel Coat") exhibited an increase in resistance of approximately 73% over the 100 hour exposure period.

Figure 5:
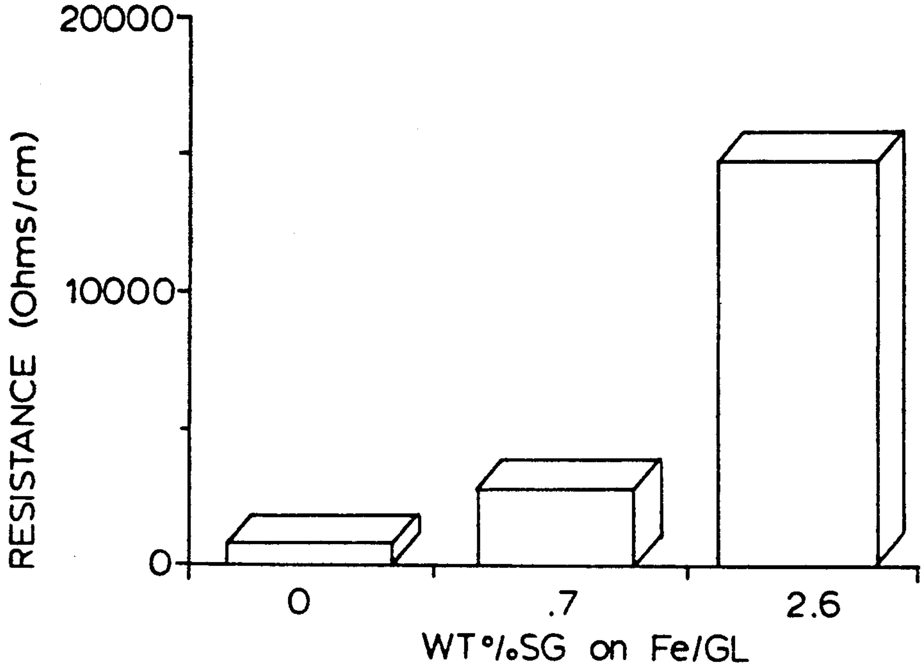
FIG. 5 is a bar graph of tow resistance, in ohms/cm., as a function of weight percent of silica overcoated on iron-coated glass filaments, based on the weight of such filaments.

FIG. 5 is a bar graph of initial tow resistance, in ohms/cm, for a tow of polysilicate-overcoated iron-coated glass filaments of the type previously described in connection with FIG. 1 (0.7 weight percent polysilicate overcoated iron-coated glass filaments, wherein the percent weight of polysilicate is based on total coated fiber weight), and a corresponding second tow in which the overcoating thickness was increased to provide 2.6 weight percent polysilicate on the iron-coated glass filaments. These overcoated filament tows were compared against a corresponding tow of iron-coated fibers, devoid of any overcoating layer thereon ("0 WT % SG on Fe/GL").

The initial resistance of these respective fiber tows was measured, with the values being shown by the bars in FIG. 5. The non-overcoated filament tow had 500 ohms/cm initial resistance, while the 0.7 weight percent polysilicate-overcoated metallized filament tow had a resistance on the order of about 3000 ohms/cm, and the 2.6% polysilicate-overcoated metallized filament tow had an initial resistance of approximately 15,000 ohms/cm.

Figure 6:
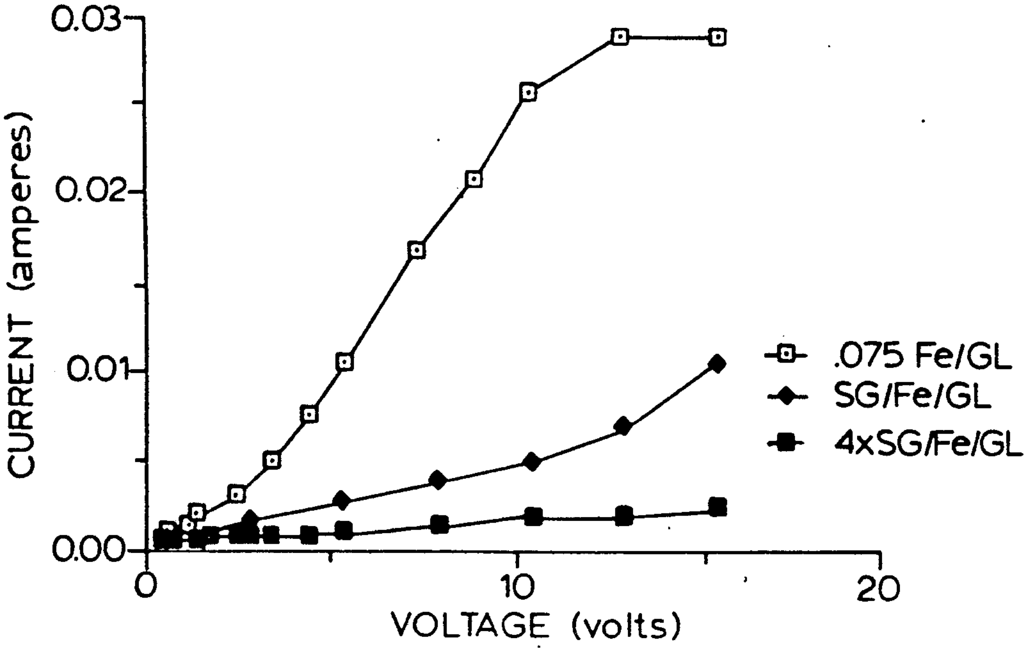
FIG. 6 is a graph of current, in amperes, as a function of voltage, for tows of iron-coated glass fibers ("0.075 Fe/GL"), a tow of silica-overcoated, iron-coated glass fibers in which the weight of the silica overcoating was 0.7 weight percent of the weight of the fibers ("SG/Fe/GL"), and a tow of silica-overcoated, iron-coated glass fibers, wherein the weight of the silica coating was 2.6% of the weight of the fibers ("4×SG/Fe/GL").

FIG. 6 is a graph of current, in amperes, as a function of voltage, for three fiber tows. The first fiber tow ("0.075 Fe/GL") comprised approximately 4.8 micron diameter glass filaments as the substrate elements, on which were coated 0.075 micron thicknesses of iron, but these filaments were not overcoated with any insulating material layers. The second tow ("SG/Fe/GL") comprised filaments coated with iron, of the same type as the first tow, but which additionally were overcoated with a polysilicate coating, at 0.7% by weight polysilicate coating, based on the total weight of the coated fiber. The third tow ("4×SG/Fe/GL") comprised iron-coated filaments of the same type of the first tow, but which were overcoated with polysilicate at 2.6% by weight of polysilicate, based on the total weight of the coated fiber.

The data in FIG. 6 show that the more heavily overcoated tow of metallized filaments had a higher resistance than the corresponding fiber tow ("SG/Fe/GL") with a low polysilicate overcoat thickness (resistance being the slope of the current versus voltage curve), but even at the higher insulated coating thickness, a small amount of current still passed through the tow. This is possibly due to the absorbed surface moisture acting as a means of conduction between metal coating areas exposed through pores of the overcoating.

Attempts to determine break-down voltage under atmospheric conditions these polysilicate overcoated samples indicated slight insulating character. Inspection of low voltage data in FIG. 6 shows that potentials of greater than 3 volts were required to create an ohmic response, i.e., a linear relationship between current and voltage. The deviation from linearity in the non-overcoated sample ("0.075 Fe/GL") at high voltages in FIG. 6 is hypothesized to be due to oxidation caused by ohmic heating. The microporous overcoat layer provided a coating of higher, but measureable, resistance.

The passage of current through this microporous layer may be controlled by the concentration of ionic conductors and the moisture content of the coating. The thinner overcoat ("SG/Fe/GL") shows some evidence of breakdown at about 13 volts, as evidenced by the change in slope of the appertaining curve. No point of breakdown is seen for the more heavily insulated sample at the voltages studied.

Thus, to control the oxidizable metal coating exposure and its rate of oxidation, the porosity of the inorganic insulating layer on the oxidizable metal coating is controllable. The use of sol-gel overcoated layers may be an effective method for providing an insulative layer on the oxidizable metal coating, if a modest increase in the density of the overall product article is acceptable. The presence of the insulating layer may protect electrical and electronic equipment while corrosion of the oxidizable metal coating takes place.

The microporous overcoat layers discussed above with reference to FIGS. 4–6, although insulative in character, did not fully preclude conductivity of the coated fibers in tow form, but did accommodate accelerate corrosion of the oxidizable metal coating on the product article, at high relative humidities. While not wishing to be bound by any theory as regards the nature of efficacy of the overcoated metallized articles of the present invention, it is believed that microporously absorbed water played a key role in the conductivity and corrosion characteristics which were observed. Densification of the overcoat layer may be employed to selectively inhibit corrosion of the oxidizable metal coating and more fully insulate the conductive fiber.

In order to measure the tow resistance of the respective fibers, as employed to generate the data plotted in the graphs of FIGS. 4–6 hereof, each tow under evaluation was mounted on a copper contact circuit board with a known spacing, in either a two-point or four-point arrangement. Electrical contact was assured through use of conductive silver paint. Fiber tows were analyzed by use of a digital multimeter. A known voltage was applied across the fiber circuit. The resulting current was metered and the resistance computed. This measurement was repeated periodically over the fiber lifetime of interest, with voltage being applied during each interval for a duration just long enough to allow measurement to be made.

Thus, the life of the conductive oxidizable metal coating may be controllably adjusted by selectively varying the thickness, density, composition, and porosity characteristics of the inorganic overcoating layer, and optionally by sulfurizing the conductive oxidizable metal coating, and/or providing a discontinuous coating of a promoter metal on the oxidizable metal film, and/or doping the oxidizable metal coating with a salt. In chaff applications, such selective overcoating, and optional sulfurization, salt doping, and/or promoter metal coating of the oxidizable metal film may be utilized to correspondingly adjust the service life of the oxidizable metal-coated chaff fibers, consistent with a desired retention of the initial radar signature characteristic thereof for a given length of time, followed by rapid dissipation of the radar signature of such "evanescent chaff" material.

As used herein, the term "oxidizable metal" is intended to be broadly construed to include elemental metals per se, and combinations of elemental metals which each other and/or with other materials, and including any and all metals, alloys, eutectics, and intermetallic materials containing one or more elemental metals, and which are depositable in sub-micron thicknesses on the substrate and subsequent to such deposition are oxidizable in character.

Although iron is a preferred oxidizable material in the practice of the present invention, and the invention has been primarily described herein with reference to iron-coated glass filaments, it will be recognized that nickel, copper, zinc, and tin, as well as other metals, may be potentially usefully employed in similar fashion. It will also be recognized that the substrate element may be widely varied, to comprise the use of other substrate element conformations, and materials of construction.

The features and advantages of the present invention are more fully shown with reference to the following non-limiting examples, wherein all parts and percentages are by weight, unless otherwise expressly stated.

EXAMPLE I

A aluminoborosilicate fiberglass roving material (E-glass, Owens Corning D filament), comprising glass filaments having a measured diameter of approximately 4.8 microns and a density of approximately 2.6 grams per cubic centimeter, was desized under nitrogen atmosphere to remove the size coating therefrom, at a temperature of approximately 700° C. Following desizing, the filament roving at a temperature of approximately 500° C. was passed through a chemical vapor deposition chamber maintained at a temperature of 110° C. The chemical vapor deposition chamber contained 10% iron pentacarbonyl in a hydrogen carrier gas. The fiber roving was passed through heating and coating deposition zones in sequence, comprising five coating deposition zones, to deposit a coating of elemental iron of approximately 0.075 micron thickness on the fiber substrate of the roving filaments.

EXAMPLE II

The procedure of Example I was repeated, and in the heating zone upstream of the second and succeeding chemical vapor deposition coating zones in the process system, the fibers coated with iron film in the preceding coating chamber were exposed to 10% hydrogen sulfide in hydrogen carrier gas mixture (the percentage being based on the total weight of hydrogen sulfide and hydrogen), at a temperature of 450–600° C., to reduce the previously applied iron film and incorporate sulfur-containing material in the film. As a result, the sulfur loading of the oxidizable iron film was about 0.1% by weight sulfur (measured as elemental sulfur), based on the weight of elemental iron in the oxidizable iron coating on the glass filament substrate.

EXAMPLE III

The sulfurized iron-coated filament roving of Example I was passed through a chemical vapor deposition chamber to which a gas stream of approximately 50 to 80 percent by weight copper hexafluoroacetylacetonate in carrier gas was supplied, resulting in deposition of copper islands whose dimensional size characteristics, as measured along the surface of the iron coating, were in the range of from about 0.5 to about 10 microns. The resulting copper-coated, sulfurized iron-coated roving then was packaged under nitrogen atmosphere in a moisture-proof package.

EXAMPLE IV

In this Example, an oxidizable iron coating was applied to a glass filament roving material as in Example I, which was sulfurized during the iron coating process as in Example II, and then coated with a discontinuous coating of copper as described in Example III. Subsequent to the formation of deposited copper islands on the iron coating, the roving was passed through a solution bath containing 2% by weight of iron (III) chloride in methanol solution, under nitrogen atmosphere. The roving then was passed through a drying oven at a temperature of approximately 100° C. under nitrogen atmosphere, to remove the methanol solvent and leave a salt coating of iron (III) chloride on the copper-coated, sulfurized iron-coated substrate. The saltdoped, copper-coated, sulfurized iron-coated roving then was packaged under nitrogen atmosphere in a moisture-proof package.

EXAMPLE V

In Brinker et al, *J. Non-Cryst. Solids,* vol. 48, 1982, pages 47–64, methods are described for making gels which result in various microstructures, using a two-step hydrolysis procedure in which relative rates of hydrolysis and condensation are varied. Microstructure development by these methods is related to gel formation which depends on (a) hydrolysis of alkoxide groups to form silanols, (b) condensation of silanols to form silicate polymers, and (c) linking of polymers to form gels.

The relative rates of these steps (a)-(c) depend on the concentration of water and the tetraaklylorthosilicate in the reaction system, and the pH of the reaction volume.

A sol gel dispersion was prepared according to the formulation set out in Table I below, to duplicate Sample A3 described in the Brinker, et al article.

TABLE I

| Component | Concentration, Mole % |
|---|---|
| Tetraethylorthosilicate | 6.1 |
| Water | 75.5 |
| N-propanol | 18.4 |
| HCl | 0.005 |

Following the procedure in the Brinker, et al article, the silicate starting material, alcohol, water and acid were initially mixed in the mole ratio of 1:3:1:0.007, as a mixture of 22 grams propanol, 22.4 grams silicate, 1.9 grams water, and 0.0026 gram acid.

This initial mixture was stirred for 1.5 hours at approximately 60° C. 16.5 milliliters of water were added and the mixture was stirred at room temperature for approximately 5 hours.

The resulting sol gel dispersion was contacted with a fiber roving of iron-coated glass filament prepared as in Example I, with the fiber roving being dipped into a container of the sol gel dispersion. The wetting of the iron coating with the sol gel dispersion appeared good, and the coated fiber roving was dried overnight at 200° C. under nitrogen atmosphere. The polysilicate overcoated metallized roving of glass filaments then is packaged under nitrogen atmosphere in a moisture-proof package.

EXAMPLE VI

A sulfurized iron-coated filament roving is prepared as in Example II, and then overcoated with a polysilicate layer according to the procedure of Example V. The resulting polysilicate-overcoated, sulfurized iron-coated filament roving then is packaged under nitrogen atmosphere in a moisture-proof package.

EXAMPLE VII

A copper-coated, sulfurized iron-coated roving overcoated with a polysilicate layer is prepared in accordance with Example III and Example V, with respect to the metallization and insulative coating applications. The resulting polysilicate overcoated, copper-coated, sulfurized iron-coated roving then is packaged under nitrogen atmosphere in a moisture-proof package.

EXAMPLE VIII

In this Example, a salt-doped, copper-coated, sulfurized iron-coated roving formed by the method of Example IV is coated with a sol gel dispersion of polysilicate and dried as in Example V to form a polysilicate-overcoated, salt-doped, copper-coated, sulfurized iron-coated roving, which then is packaged under nitrogen atmosphere in a moisture-proof package.

While preferred and illustrative embodiments of the invention have been described, it will be appreciated that numerous modifications, variations, and other embodiments are possible, and accordingly, all such modifications, variations, and embodiments are to be regarded as being within the spirit and scope of the present invention.

What is claimed is:

1. An article comprising a substrate formed of a material selected from the group consisting of glasses, polymers, pre-oxidized carbon, non-conductive carbon, and ceramic materials, which is coated with an oxidizable conductive metal at a thickness of less than 1.0 micron, and overcoated with an outer layer consisting essentially of an inorganic electrically insulative material having a porous microstructure characterized by:

- an average pore size of from about 50 to about 1,000 Angstroms;
- a thickness of from about 200 to about 2500 Angstroms; and
- sufficient porosity to permit permeation of atmospheric moisture and oxygen to the underlying oxidizable metal when the article is exposed to atmospheric exposure conditions.

2. An article according to claim 1, wherein the non-conductive substrate is formed of a glass material.

3. An article according to claim 1, wherein the non-conductive substrate is formed of a silicate glass.

4. An article according to claim 1, wherein the non-conductive substrate is in the form of a filament.

5. An article according to claim 4, wherein the filament has a diameter of from about 0.5 to about 25 microns.

6. An article according to claim 4, wherein the filament has a diameter of from about 2 to about 12 microns.

7. An article according to claim 1, wherein the oxidizable conductive metal coating comprises a metal selected from the group consisting of iron, nickel, copper, tin, and zinc.

8. An article according to claim 1, wherein the oxidizable conductive metal coating comprises a continuous sub-micron film of iron, ferrous metal, or ferrous alloy.

9. An article according to claim 1, wherein the oxidizable metal coating comprises an oxidizable iron coating formed on the substrate by chemical vapor deposition from an organoiron precursor material.

10. An article according to claim 1, wherein the oxidizable metal coating comprises an oxidizable iron coating formed by chemical vapor deposition of iron from a precursor material comprising iron pentacarbonyl.

11. An article according to claim 1, wherein the oxidizable metal coating has a thickness of from about $2\times10^{-3}$ to about 0.25 micron.

12. An article according to claim 1, wherein the oxidizable metal coating has a thickness of from about 0.025 to about 0.10 micron.

13. An article according to claim 1, wherein the oxidizable metal coating has a salt coated thereon.

14. An article according to claim 13, wherein the salt is selected from the group consisting of metal halides, metal sulfates, metal nitrates, and organic salts.

15. An article according to claim 13, wherein the salt is selected from the group consisting of lithium chloride, iron (III) chloride, zinc chloride, sodium chloride, and copper sulfate.

16. An article according to claim 13, comprising from about 0.005 to about 25% by weight of salt, based on the weight of oxidizable metal, coated on the oxidizable metal coating.

17. An article according to claim 13, comprising from about 0.05 to about 20% by weight of salt, based on the weight of oxidizable metal, coated on the oxidizable metal coating.

18. An article according to claim 13, wherein from about 0.1 to about 15% by weight of salt is coated on the oxidizable metal coating, based on the weight of oxidizable metal in said coating.

19. An article according to claim 13, wherein the salt coating comprises a metal salt coating formed by solution bath contacting of the oxidizable metal-coated substrate.

20. An article according to claim 1, wherein the oxidizable metal coating is sulfurized with from about 0.01 to about 10% by weight, based on the weight of oxidizable metal in the oxidizable metal coating, of a sulfur-containing material.

21. An article according to claim 1, wherein the oxidizable metal coating is sulfurized with from about 0.02 to about 5% by weight, based on the weight of oxidizable metal in the oxidizable metal coating, of a sulfur-containing material.

22. An article according to claim 1, wherein the oxidizable metal coating is sulfurized with from about 0.05 to about 2.0% by weight, based on the weight of oxidizable metal in the oxidizable metal coating, of a sulfur-containing material.

23. An article according to claim 1, wherein the oxidizable metal coating comprises a sulfurized iron coating formed by chemical vapor deposition of an iron coating in sequential coating steps including intermediate heating steps between the metal deposition steps wherein sulfur-containing material is deposited on the previously applied iron coating.

24. An article according to claim 1, wherein the microporous layer of inorganic electrically insulative material is formed of a material selected from the group consisting of glasses, ceramics, and combinations thereof.

25. An article according to claim 1, wherein the microporous layer of inorganic electrically insulative material is formed of a material selected from the group consisting of polysilicate, titania, alumina, and combinations thereof.

26. An article comprising a substrate formed of a material selected from the group consisting of glasses, polymers, pre-oxidized carbon, non-conductive carbon, and ceramic materials, which is coated with an oxidizable metal at a thickness of less than 1.0 micron, and overcoated with an outer layer consisting essentially of a material selected from the group consisting of polysilicate, titania, alumina, and combinations thereof, having a porous microstructure characterized by:

- an average pore size of from about 50 to about 1,000 Angstroms;
- a thickness of from about 200 to about 2500 Angstroms; and
- sufficient porosity to permit permeation of atmospheric moisture and oxygen to the underlying oxidizable metal when the article is exposed to atmospheric exposure conditions.

27. A chaff comprising metal-coated fiber including a fiber substrate formed of a material selected from the group consisting of glasses, polymers, pre-oxidized carbon, non-conductive carbon, and ceramic materials, which is coated with an oxidizable metal at a thickness of less than 1.0 micron, and overcoated with an outer layer consisting essentially of a material selected from the group consisting of polysilicate, titania, alumina, and combinations thereof, having a porous microstructure characterized by:

- an average pore size of from about 50 to about 1,000 Angstroms;
- a thickness of from about 200 to about 2500 Angstroms; and
- sufficient porosity to permit permeation of atmospheric moisture and oxygen to the underlying oxidizable metal when the chaff is exposed to atmospheric exposure conditions.

* * * * *